(12) United States Patent
Murase et al.

(10) Patent No.: US 9,994,490 B2
(45) Date of Patent: Jun. 12, 2018

(54) BUILDING MATERIAL

(71) Applicant: NICHIHA CORPORATION, Nagoya-Shi, Aichi (JP)

(72) Inventors: Miho Murase, Nagoya (JP); Hiroyuki Taguchi, Nagoya (JP)

(73) Assignee: NICHIHA CORPORATION, Nagoya-shi (JP)

( * ) Notice: Subject to any disclaimer, the term of this patent is extended or adjusted under 35 U.S.C. 154(b) by 177 days.

(21) Appl. No.: 14/884,962

(22) Filed: Oct. 16, 2015

(65) Prior Publication Data
US 2016/0289128 A1 Oct. 6, 2016

(30) Foreign Application Priority Data
Mar. 30, 2015 (JP) .................................. 2015-068568

(51) Int. Cl.
C04B 41/71 (2006.01)
C04B 41/52 (2006.01)
C04B 41/00 (2006.01)
E04C 2/04 (2006.01)

(52) U.S. Cl.
CPC ............ C04B 41/52 (2013.01); C04B 41/009 (2013.01); C04B 41/71 (2013.01); E04C 2/04 (2013.01)

(58) Field of Classification Search
CPC ... C04B 41/52; C04B 41/522; C04B 41/4884; C04B 41/483; C04B 14/042; C04B 14/06; C04B 14/28; C04B 41/009; C04B 14/022; C04B 20/0048; C04B 28/02; C04B 41/4842; C04B 41/71

USPC .................................................. 428/212, 220
See application file for complete search history.

(56) References Cited

U.S. PATENT DOCUMENTS

2007/0000771 A1* 1/2007 Lang .................... C23C 14/025
204/192.27
2007/0099000 A1* 5/2007 Hirano .................... C03C 17/34
428/432

FOREIGN PATENT DOCUMENTS

| JP | 11-21185 A | 1/1999 |
| JP | 2006-181492 A | 7/2006 |
| JP | 2010-58846 A | 3/2010 |

OTHER PUBLICATIONS

Haruna et al (JP 2000-061392 machine translation), Feb. 2, 2000.*
Office Action issued in the corresponding Japanese Patent Application No. 2015-068568 dated Apr. 25, 2017.

* cited by examiner

*Primary Examiner* — Lawrence Ferguson
(74) *Attorney, Agent, or Firm* — Birch, Stewart, Kolasch & Birch, LLP

(57) ABSTRACT

A building material includes a base material, a first mirror coating formed on the surface of the base material, a second mirror coating formed on the surface of the first mirror coating, wherein the first mirror coating contains a filler and a first resin material, the pencil hardness of the first mirror coating is in the range of about 3H to about 8H, the second mirror coating contains at least a second resin material, and the pencil hardness of the second mirror coating is in the range of about B to about 2H.

18 Claims, 2 Drawing Sheets

BUILDING MATERIAL

CROSS REFERENCE TO RELATED APPLICATIONS

This application is based on Japanese Patent Application No. 2015-068568 filed with the Japanese Patent Office on Mar. 30, 2015, the entire content of which is hereby incorporated by reference.

BACKGROUND OF THE INVENTION

1. Field of the Invention

The present invention relates to a building material such as a siding board.

2. Description of the Related Art

A ceramic siding board, a metal siding board, an ALC board (Autoclaved Lightweight aerated Concrete board), and the like are used as building materials constituting the exterior walls and the interior walls of buildings.

In recent years, there has been an increasing need for the above-described building materials to have a high-quality appearance. As one measure to meet this need, mirror finish on the surface of the building materials has been examined.

JP 2006-181492A discloses a method of forming a finished layer in the following manner. First, a polyester surfacer is applied to the surface of a base material to form an underlayer, onto which a polyester black enamel paint is then applied to form a middle coat layer. Then, a polyester clear paint is applied to the upper surface of the middle coat layer. After being cured and dried, the coating of the polyester clear paint is polished to form a finished layer. In this method, the middle coat layer is formed by multiple spray applications at substantially equally-spaced time intervals, and the finished layer is formed by spray applications at substantially the same time intervals. With this method, the clear paint constituting the finished layer contains no pigment, and therefore, clogging of a coated abrasive is prevented during polishing, and the subsequent polishing using a cotton buff or the like renders the surface dense and flat, making it possible to perform high-quality burnished mirror finish.

In general, building materials such as a ceramic siding board are stacked for storage or transportation, as described in JP 2010-58846A.

SUMMARY OF THE INVENTION

In the case where building materials are stacked this way, there is a concern that blocking may occur when the above-described mirror finished coatings are formed on the surface of the building materials. Here, "blocking" refers to a phenomenon in which two members that are stacked together, for example, adhere to each other on their contact surfaces, leading to peeling of the coating. JP 2006-181492A and JP 2010-58846A do not disclose a building material to solve the blocking.

One conceivable example of the methods for inhibiting the occurrence of the above-described blocking is to increase the hardness of the coating. However, if the hardness of the coating is too high, other concerns such as the occurrence of burrs in the coating and breakage of the coating may arise at the time of cutting a plate-like building material into an appropriate size.

The present invention has been made in order to solve the above-described concerns, and it is an object of the invention to provide a building material in which blocking is less likely to occur in the coating, and that is less susceptible to the occurrence of burrs or breakage during processing.

In order to achieve the above-described object, a building material according to the present invention includes a base material, a first mirror coating formed on the base material and containing a filler and a first resin material, the first mirror coating having a pencil hardness in a range of about 3H to about 8H, and a second mirror coating formed on the first mirror coating and containing at least a second resin material, the second mirror coating having a pencil hardness in a range of about B to about 2H.

With the building material of the present invention, by defining the pencil hardnesses of the first mirror coating and the second mirror coating that are formed on the surface of the base material, it is possible to achieve a building material that has excellent blocking resistance and is less susceptible to the occurrence of burrs or breakage during cutting.

DESCRIPTION OF THE EMBODIMENTS

Figure 1:
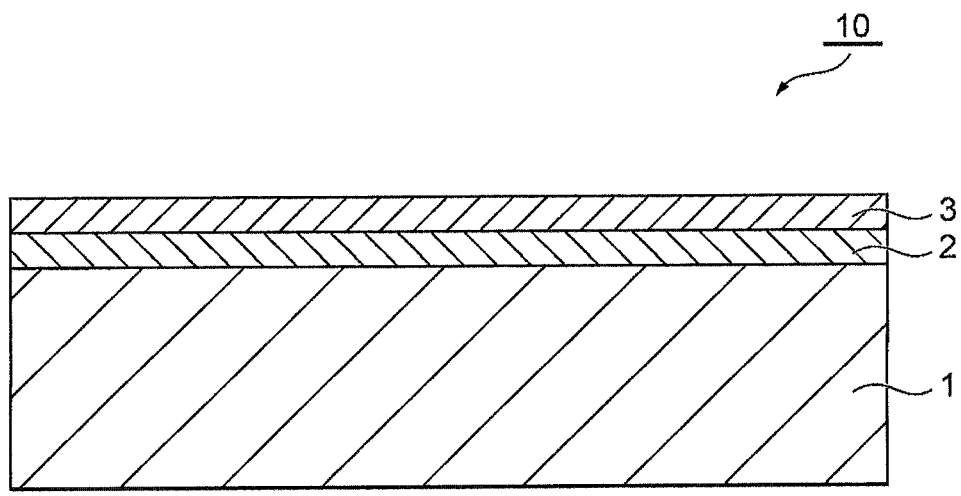
FIG. 1 is an enlarged partial vertical cross-sectional view of Embodiment 1 of a building material according to the present invention.

A building material according to an aspect of the present invention includes a base material, a first mirror coating formed on the surface of the base material, and a second mirror coating formed on the surface of the first mirror coating, and the first mirror coating contains a filler and a first resin material. The pencil hardness of the first mirror coating is in the range of about 3H to about 8H.

The second mirror coating contains at least a second resin material, and the pencil hardness of the second mirror coating is in the range of about B to about 2H.

By defining the pencil hardnesses of the first mirror coating and the second mirror coating that are sequentially formed on the surface of the base material, the building material inhibits the occurrence of blocking and inhibits the occurrence of burrs or breakage of the building material during cutting.

Here, examples of the base material constituting the building material include a ceramic siding board composed mainly of cement, an ALC board, a metal siding board composed mainly of metal, and a resin board.

Note that a sealer coating made of an epoxy resin, an acrylic resin, a urethane resin or the like is optionally formed on the surface of the base material. It is preferable that the sealer coating is formed because the adhesion between the base material and the first mirror coating is improved.

Since minute irregularities are present on the surface of the base material even if the surface is polished, a mirror coating is formed in order to render the surface of the base material specular. According to the present aspect, the first mirror coating directly formed on the surface of the base material is formed from a predetermined filler and the first resin material, and a second mirror coating containing at least the second resin material is formed on the surface of the first mirror coating.

Here, "containing at least the second resin material" should be construed to encompass a form in which the second mirror coating further contains a pigment as a colorant, a filler, a defoamer, a light stabilizer, an ultraviolet absorber and the like, as well as a form in which the second mirror coating is made of the second resin material.

By defining the hardness (pencil hardness) for both the first mirror coating and the second mirror coating, the building material has an improved blocking inhibition effect, and becomes less susceptible to the occurrence of burrs or breakage during cutting. For example, when the first mirror coating is not specular, the second mirror coating formed on the surface of the first mirror coating will not be specular. Therefore, the first mirror coating needs to be truly specular.

Here, the pencil hardness of the first mirror coating is in the range of about 3H or more and about 8H or less, and the pencil hardness of the second mirror coating is in the range of about B or more and about 2H or less.

The pencil hardness is a hardness measured in accordance with the scratch hardness test (pencil test) prescribed in JIS K5600. A high hardness does not simply mean high resistance to scratch, robustness, or good performance. As the hardness increases, the bendability is reduced, and cracking is more likely to occur in the coating during a bending test. This may contrarily degrade the product performance. Pencil hardness ranges from 6B to 9H, in order of increasing hardness.

By setting the pencil hardness of the first mirror coating formed on the surface of the base material to a higher range, namely, the range of about 3H or more and about 8H or less, and setting the pencil hardness of the second mirror coating on the surface of the first mirror coating to a relatively low range, namely, the range of about B or more and about 2H or less, the building material according to the present aspect improves the blocking resistance of the mirror coating as a whole, and is less susceptible to the occurrence of burrs or breakage during cutting.

The present inventors have determined that when the hardnesses of the first mirror coating and the second mirror coating fall outside the above-described numerical ranges, the coating is likely to be peeled due to insufficient blocking resistance, or burrs are likely to occur during cutting.

As the filler that forms the first mirror coating, it is preferable to use one or more of talc, calcium carbonate, silica (crystalline silica, fused silica, amorphous silica), glass (glass flake, powdered glass fiber), quartz (powder), aluminum (powder), and mica (powder). Furthermore, as the first resin material, it is preferable to adopt one of an ultraviolet-cured acrylic resin (UV-cured acrylic resin) and a urethane resin. By adopting these fillers and resin materials, and preferably adjusting the content percentage of the filler in the first mirror coating to the range of about 40 mass % or more and about 70 mass % or less, the pencil hardness of the first mirror coating can be easily set to the range of about 3H or more and about 8H or less.

On the other hand, as the second resin material that forms the second mirror coating, it is preferable to use at least one of a fluororesin, an acrylic resin, and a urethane resin. When the second mirror coating contains a pigment, it is possible to adopt titanium oxide, carbon, red iron oxide, chrome yellow, iron oxide, ultramarine, phthalocyanine blue, cobalt, chromium oxide and the like as this pigment.

By adopting the above-described second resin materials, the hardness of the second mirror coating can be easily set to the range of about B or more and about 2H or less.

In a preferred embodiment of the building material according to the present aspect, a protective coating is formed on the surface of the second mirror coating, and the pencil hardness of the protective coating is in the range of about B or more and about 2H or less.

Here, as the protective coating, it is possible to adopt, for example, a fluororesin, an acrylic resin, and an acrylic silicone resin. Accordingly, the protective coating is formed from the same resin material as the second resin material that forms the second mirror coating, making it possible to easily obtain a protective coating having a pencil hardness comparable to that of the second mirror coating.

By providing the protective coating having a hardness comparable to that of the second mirror coating on the surface of the second mirror coating, it is possible to improve the weather resistance of the building material, in addition to further improving the blocking resistance.

In this case, when the hardness of the second mirror coating is in the range of about B or more and about 2H or less, for example, it is preferable that the hardness of the protective coating is also in the range of about B or more and about 2H or less. It is more preferable that the difference in pencil harness is set to be within about three grades in the scale for pencil hardness.

Hereinafter, embodiments of the building material according to the invention will be described with reference to the drawings.

Embodiment 1 of Building Material

FIG. 1 is an enlarged partial vertical cross-sectional view of Embodiment 1 of a building material according to the invention.

A building material 10 as shown is configured as a whole by a first mirror coating 2 being formed on the surface of a base material 1 and a second mirror coating 3 being formed on the surface of the first mirror coating 2.

Here, the base material 1 is formed, for example, of a ceramic siding board composed mainly of cement (e.g., a wood cement board, a fiber reinforced cement board, a fiber reinforced cement/calcium silicate board, or a slag plaster board), an ALC board, a metal siding board made of a metal plate, or a resin board.

The first mirror coating 2 is formed from a filler and a first resin material. Here, as the filler, it is possible to adopt, for example, one or more of talc, calcium carbonate, silica (crystalline silica, fused silica, amorphous silica), glass (glass flake, powdered glass fiber), quartz (powder), aluminum (powder), and mica (powder). As the first resin material, it is possible to adopt, for example, one of a UV-cured acrylic resin and a urethane resin. Furthermore, the content percentage of the filler in the first mirror coating 2 is adjusted to the range of about 40 mass % or more and about 70 mass % or less.

On the other hand, the second mirror coating 3 is formed from a pigment and a second resin material. Here, as the pigment, it is possible to adopt, for example, titanium oxide, carbon, red iron oxide, chrome yellow, iron oxide, ultramarine, phthalocyanine blue, cobalt, and chromium oxide. As the second resin material, it is possible to adopt, for example, a fluororesin, an acrylic resin, and a urethane resin.

By the first mirror coating 2 being formed from the above-described first resin material and the content percentage of the filler being adjusted to the range of about 40 mass % or more and about 70 mass % or less, the pencil hardness of the first mirror coating 2 is in the range of about 3H or more and about 8H or less.

On the other hand, the second mirror coating 3 is formed from the above-described second resin material, and the pencil hardness of the second mirror coating 3 is in the range of about B or more and about 2H or less.

By the pencil hardness of the first mirror coating 2 directly formed on the surface of the base material 1 being in the range of about 3H or more and about 8H or less and the pencil hardness of the second mirror coating 3 formed on the surface of the first mirror coating 2 being in the range of about B or more and about 2H or less, the blocking resistance of the mirror coating as a whole is improved, and a building material 10 that is less susceptible to the occurrence of burrs or breakage during cutting is formed.

Here, an exemplary method for producing the building material 10 will be described.

First, the surface of the base material 1 is polished with a belt sander (polished while sequentially changing the sandpaper mesh from #80 to #100), and a sealer is applied thereto (e.g., material: epoxy sealer, applied amount: 3 g/shaku$^2$) (1 shaku=303.03 mm).

Next, the method for forming the first mirror coating 2 on the surface of the base material 1 will be described for the case of adopting a UV-cured acrylic resin as the resin material, and the case of adopting a urethane resin as the resin material.

In the case of adopting a UV-cured acrylic resin, ultraviolet coating (hereinafter referred to as "UV coating") is performed (e.g., material: ultraviolet-curable acrylic resin (UV-curable acrylic resin), applied amount: 10 g/shaku$^2$) on the surface of the base material 1 to which the sealer is to be applied, by using a natural roll coater or the like. After ultraviolet irradiation (hereinafter referred to as "UV irradiation") is performed, UV coating is performed again (e.g., material: UV-curable acrylic resin, applied amount: 10 g/shaku$^2$), followed by UV irradiation. Finally, polishing is performed with a surface polisher (polishing is performed while sequentially changing the sandpaper mesh from #320 to #400), to produce a first mirror coating 2.

On the other hand, in the case of adopting a urethane resin, urethane coating (e.g., coating material: urethane resin, applied amount: 12 g/shaku$^2$) is performed on the surface of the base material 1 to which the sealer is to be applied, by spraying or the like, followed by drying. Finally, surface polishing (the sandpaper mesh is sequentially changed from #320 to #400) is performed to produce a first mirror coating 2.

A second mirror coating material is applied (e.g., material: fluororesin or the like, applied amount: 110 g/shaku$^2$) onto the surface of the produced first mirror coating 2 by spraying or the like, followed by drying, to produce a second mirror coating 3.

Thus, a building material 10 is produced.

Embodiment 2 of Building Material

Figure 2:
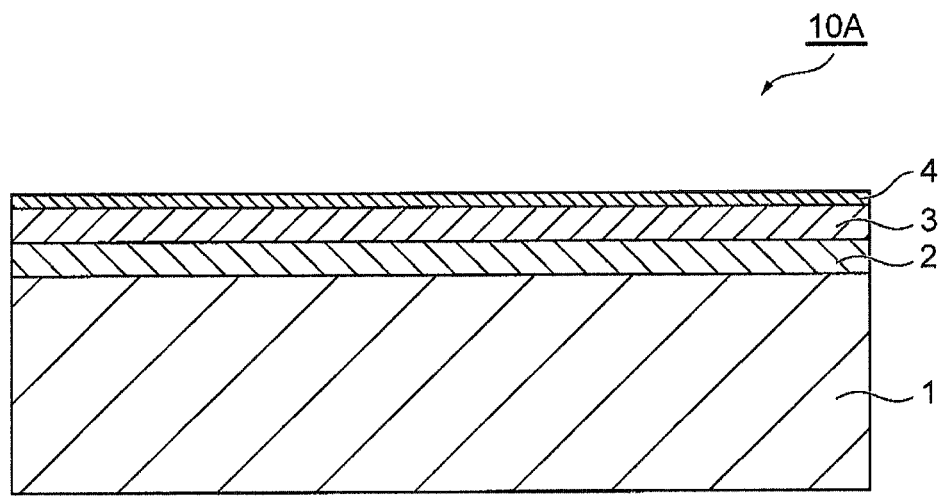
FIG. 2 is an enlarged partial vertical cross-sectional view of Embodiment 2 of a building material according to the present invention.

FIG. 2 is an enlarged partial vertical cross-sectional view of Embodiment 2 of a building material according to the invention.

In a building material 10A as shown, a first mirror coating 2 is formed on the surface of a base material 1, and a second mirror coating 3 is formed on the surface of the first mirror coating 2. The building material 10A is configured as a whole by further forming a protective coating 4 on the surface of the second mirror coating 3.

Here, the protective coating 4 is formed, for example, from a fluororesin, an acrylic resin, or an acrylic silicone resin. In other words, the protective coating 4 can be formed from the same resin material as the second resin material that forms the second mirror coating 3. Accordingly, it is possible to achieve a pencil hardness in the range of about B or more and about 2H or less, which is comparable to the pencil hardness of the second mirror coating 3.

With the building material 10A, a building material has further improved blocking resistance and also has excellent weather resistance with the protective coating 4 having a hardness comparable to or the same as that of the second mirror coating 3 on the surface of the second mirror coating 3.

Next, the method for producing the building material 10A will be described. This method follows the same procedure as the method for producing the building material 10 up until the second mirror coating 3 is formed. A protective coating material is applied (e.g., material: fluororesin or the like, applied amount: 10 g/shaku$^2$) onto the surface of the second mirror coating 3 by spraying or the like, followed by drying to produce a protective coating 4, thus producing a building material 10A.

Verification Tests and Results Thereof

The present inventors conducted tests for verifying various performances of the building material according to the embodiments of the invention. To perform the tests, test pieces of Examples 1 to 13 and test pieces of Comparative Examples 1 to 5 were produced. For each test piece, specular observation was performed, and the blocking resistance, the coating condition in a cut location, and the incombustibility were verified. Here, the applied amounts of the coating materials of the protective coating, the second mirror coating, and the first mirror coating were 10 g/shaku$^2$, 10 g/shaku$^2$, and 12 to 20 g/shaku$^2$, respectively. The surface of the wood cement board used has a flat pattern (flat). Table 1 below shows the raw materials forming the test pieces, the pencil hardnesses, and the evaluation results.

TABLE 1

| | | | Ex. 1 | Ex. 2 | Ex. 3 | Ex. 4 | Ex. 5 |
|---|---|---|---|---|---|---|---|
| Protective coating | Resin | Type | — | — | — | — | — |
| | | Tg (° C.) | — | — | — | — | — |
| Second mirror coating | Pigment | Type | Carbon | Carbon | Carbon | Carbon | Carbon |
| | | Content (mass %) | 2 | 2 | 2 | 2 | 2 |
| | Resin material | Type | Fluorine | Fluorine | Fluorine | Fluorine | Fluorine |
| | | Tg (° C.) | 30 | 30 | 40 | 50 | 40 |
| First mirror coating | Filler | Type | Talc, Calcium carbonate, Silica | Talc, Calcium carbonate, Silica | Talc, Calcium carbonate, Silica | Talc, Calcium carbonate, Silica | Talc, Calcium carbonate, Silica |
| | | Content (mass %) | 40 | 55 | 50 | 60 | 70 |
| | Resin material | Type | UV-cured acrylic | UV-cured acrylic | UV-cured acrylic | UV-cured acrylic | UV-cured acrylic |
| | | Tg (° C.) | — | — | — | — | — |

TABLE 1-continued

|  |  |  | | | | | |
|---|---|---|---|---|---|---|---|
|  | Base material |  | Wood cement board | Wood cement board | Wood cement board | Wood cement board | Wood cement board |
| Pencil hardness | Protective coating |  | — | — | — | — | — |
|  | Second mirror coating |  | B | B | HB | H | HB |
|  | First mirror coating |  | 3H | 5H | 4H | 6H | 8H |
| Evaluation | Specular observation |  | ○ | ○ | ○ | ○ | ○ |
|  | Blocking resistance |  | ○ | ○ | ○ | ○ | ○ |
|  | Coating condition in cut location |  | ○ | ○ | ○ | ○ | ○ |
|  | Incombustibility |  | ○ | ○ | ○ | ○ | ○ |

|  |  |  | Ex. 6 | Ex. 7 | Ex. 8 | Ex. 9 | Ex. 10 |
|---|---|---|---|---|---|---|---|
| Protective coating | Resin | Type | Fluorine | Fluorine | Fluorine | — | Urethane |
|  |  | Tg (° C.) | 40 | 30 | 50 | — | 65 |
| Second mirror coating | Pigment | Type | Carbon | Carbon | Carbon | — | Carbon |
|  |  | Content (mass %) | 2 | 2 | 2 | — | 2 |
|  | Resin material | Type | Fluorine | Fluorine | Fluorine | Urethane | Urethane |
|  |  | Tg (° C.) | 30 | 40 | 50 | 60 | 65 |
| First mirror coating | Filler | Type | Talc, Calcium carbonate, Silica | Talc, Calcium carbonate, Silica | Talc, Calcium carbonate, Silica | Talc, Calcium carbonate, Silica | Talc, Calcium carbonate, Silica |
|  |  | Content (mass %) | 55 | 50 | 60 | 50 | 65 |
|  | Resin material | Type | UV-cured acrylic | UV-cured acrylic | UV-cured acrylic | Urethane | Urethane |
|  |  | Tg (° C.) | — | — | — | 65 | 70 |
|  | Base material |  | Wood cement board | Wood cement board | Wood cement board | Wood cement board | Wood cement board |
| Pencil hardness | Protective coating |  | HB | B | H | — | 2H |
|  | Second mirror coating |  | B | HB | H | H | 2H |
|  | First mirror coating |  | 5H | 4H | 6H | 3H | 4H |
| Evaluation | Specular observation |  | ○ | ○ | ○ | ○ | ○ |
|  | Blocking resistance |  | ○ | ○ | ○ | ○ | ○ |
|  | Coating condition in cut location |  | ○ | ○ | ○ | ○ | ○ |
|  | Incombustibility |  | ○ | ○ | ○ | ○ | ○ |

|  |  |  | Ex. 11 | Ex. 12 | Ex. 13 |
|---|---|---|---|---|---|
| Protective coating | Resin | Type | — | Acrylic silicone | Acrylic silicone |
|  |  | Tg (° C.) | — | 50 | 50 |
| Second mirror coating | Pigment | Type | Carbon | Carbon | Carbon |
|  |  | Content (mass %) | 2 | 2 | 2 |
|  | Resin material | Type | Acrylic | Acrylic | Acrylic |
|  |  | Tg (° C.) | 60 | 65 | 60 |
| First mirror coating | Filler | Type | Talc, Calcium carbonate, Silica | Talc, Calcium carbonate, Silica | Talc, Calcium carbonate, Silica |
|  |  | Content (mass %) | 50 | 65 | 60 |
|  | Resin material | Type | UV-cured acrylic | Urethane | UV-cured acrylic |
|  |  | Tg (° C.) | — | 70 | — |
|  | Base material |  | Wood cement board | Wood cement board | Wood cement board |
| Pencil hardness | Protective coating |  | — | F | F |
|  | Second mirror coating |  | F | 2H | H |
|  | First mirror coating |  | 4H | 4H | 6H |
| Evaluation | Specular observation |  | ○ | ○ | ○ |
|  | Blocking resistance |  | ○ | ○ | ○ |
|  | Coating condition in cut location |  | ○ | ○ | ○ |
|  | Incombustibility |  | ○ | ○ | ○ |

|  |  |  | Com. Ex. 1 | Com. Ex. 2 | Com. Ex. 3 | Com. Ex. 4 | Com. Ex. 5 |
|---|---|---|---|---|---|---|---|
| Protective coating | Resin | Type | — | — | Fluorine | — | Urethane |
|  |  | Tg (° C.) | — | — | 25 | — | 75 |
| Second mirror coating | Pigment | Type | Carbon | Carbon | Carbon | Carbon | Carbon |
|  |  | Content (mass %) | 0.5 | 10 | 0.5 | 0.5 | 10 |

TABLE 1-continued

| | | | | | | | |
|---|---|---|---|---|---|---|---|
| First mirror coating | Resin material | Type | Fluorine | Fluorine | Fluorine | Urethane | Urethane |
| | | Tg (° C.) | 25 | 70 | 25 | 40 | 75 |
| | Filler | Type | Talc, Calcium carbonate, Silica | Talc, Calcium carbonate, Silica | Talc, Calcium carbonate, Silica | Talc, Calcium carbonate, Silica | Talc, Calcium carbonate, Silica |
| | | Content (mass %) | 30 | 30 | 30 | 30 | 50 |
| | Resin material | Type | UV-cured acrylic | UV-cured acrylic | UV-cured acrylic | Urethane | Urethane |
| | | Tg (° C.) | — | — | — | 40 | 75 |
| | Base material | | Wood cement board | Wood cement board | Wood cement board | Wood cement board | Wood cement board |
| Pencil hardness | Protective coating | | — | — | 2B | — | 4H |
| | Second mirror coating | | 2B | 3H | 2B | B | 4H |
| | First mirror coating | | 2H | 2H | 2H | HB | 5H |
| Evaluation | Specular observation | | Δ | Δ | Δ | Δ | ○ |
| | Blocking resistance | | × | ○ | × | × | ○ |
| | Coating condition in cut location | | ○ | × | ○ | ○ | × |
| | Incombustibility | | × | × | × | ○ | ○ |

"Pencil hardness" in Table 1 was measured by scratching the coatings in accordance with the scratch hardness test (pencil test) prescribed in JIS K5600.

"Specular observation" shows the result of placing a board serving as a test piece under a tube of fluorescent lamp, and visually observing a reflection of the light from the fluorescent lamp on the surface of the coating. As for the determination of the results, "○" indicates that the contour line of the light reflected from the fluorescent lamp can be clearly confirmed and is seen as a straight line (good), "×" indicates that the contour line of the light reflected from the fluorescent lamp is unclear and blurred, and cannot be confirmed as a straight line (poor), and "Δ" indicates that the contour line of the light reflected from the fluorescent lamp can be confirmed, but is not seen as a straight line and appears to be flickering (acceptable).

"Blocking resistance" shows the result of placing two boards via a packing sheet with their surfaces facing each other so as to form a single package, stacking twenty packages thus formed on top of each other, unpacking the packages after an elapse of 24 hours, and observing the condition of the coating surface of each board. As for the determination of the results, "○" indicates that the coating was not peeled (good), and "×" indicates that the coating was peeled (poor).

"Coating condition in cut location" shows the result of cutting the board by a ceramic siding-cutting circular saw (all-diamond chip saw) and observing the coating condition in the cut location. As for the determination of the results, "○" indicates that burrs (rough edges) cannot be clearly confirmed by visual inspection (good), and "×" indicates that burrs (rough edges) can be sufficiently confirmed by visual inspection (poor).

In addition, "Incombustibility" shows the result of measuring the gross calorific value for 10 minutes by using a cone calorimeter in accordance with ISO5660. As for the determination of the results, "○" indicates that the gross calorific value was 8 MJ/m$^2$ or less and there was no cracking on the surface of the coating (good), "×" indicates that the gross calorific value was greater than 8 MJ/m$^2$ (poor), and "Δ" indicates that the gross calorific value was 8 MJ/m$^2$ or less, but cracking occurred on the surface of the coating (acceptable).

As can be seen from Table 1, it was demonstrated that Examples 1 to 13, in which the pencil hardness of the first mirror coating is in the range of about 3H or more and about 8H or less and the pencil hardness of the second mirror coating is in the range of about B or more and about 2H or less, showed favorable results for all of the specular observation, the blocking resistance, and the coating condition in the cut location. In addition, it was demonstrated that Examples 1 to 13 also showed favorable results for the incombustibility.

In Examples 1 to 13, the filler content in the first mirror coating is in the range of about 40 mass % to about 70 mass %.

On the other hand, it was demonstrated that Comparative Examples 1 to 5, in which the pencil hardness of at least one of the first mirror coating and the second mirror coating falls outside the above-described numerical ranges, showed unfavorable results for one of the blocking resistance and the coating condition in the cut location.

Embodiments of the present invention have been described above in detail with reference to the drawings. However, the specific configuration is by no means limited to the embodiments. Any design modifications and the like made within a scope that does not depart from the gist of the invention are encompassed by the invention.

What is claimed is:

1. A building material comprising:
   a ceramic siding board comprising cement;
   a first mirror coating formed on the ceramic siding board and comprising a filler and a first resin material, the first mirror coating having a pencil hardness in a range of about 3H to about 8H; and
   a second mirror coating formed on the first mirror coating and comprising a second resin material, the second mirror coating having a pencil hardness in a range of about B to about 2H.

2. The building material according to claim 1, wherein the second mirror coating further comprises a pigment.

3. The building material according to claim 2, wherein the filler comprises at least one of talc, calcium carbonate, silica, glass, quartz, aluminum, and mica.

4. The building material according to claim 3, wherein a content percentage of the filler in the first mirror coating is in a range of about 40 mass % to about 70 mass %.

5. The building material according to claim 1, wherein the filler comprises at least one of talc, calcium carbonate, silica, glass, quartz, aluminum, and mica.

6. The building material according to claim 5, wherein a content percentage of the filler in the first mirror coating is in a range of about 40 mass % to about 70 mass %.

7. The building material according to claim 1, wherein the first resin material comprises at least one of an ultraviolet-cured acrylic resin and a urethane resin.

8. The building material according to claim 7, wherein the second resin material comprises at least one of a fluororesin, an acrylic resin, and a urethane resin.

9. The building material according to claim 1, wherein the second resin material comprises at least one of a fluororesin, an acrylic resin, and a urethane resin.

10. The building material according to claim 1, wherein the first resin material of the first mirror coating comprises at least one of an ultraviolet-cured acrylic resin and a urethane resin,
a content percentage of the filler in the first mirror coating is in a range of about 40 mass % to about 70 mass %,
the filler comprises at least one of talc, calcium carbonate, silica, glass, quartz, aluminum, and mica,
the second mirror coating contains a pigment, and
the second resin material comprises at least one of a fluororesin, an acrylic resin, and a urethane resin.

11. The building material according to claim 10, wherein a protective coating is formed on a surface of the second mirror coating, and a pencil hardness of the protective coating is in the range of about B to about 2H.

12. The building material according to claim 11, wherein the protective coating is formed from the second resin material.

13. The building material according to claim 1, wherein a protective coating is formed on a surface of the second mirror coating, and a pencil hardness of the protective coating is in the range of about B to about 2H.

14. The building material according to claim 13, wherein the protective coating is formed from the second resin material.

15. The building material according to claim 1, wherein a sealer coating is formed on a surface of the ceramic siding board, and the first mirror coating is formed on a surface of the sealer coating.

16. The building material according to claim 1, wherein a protective coating is formed on a surface of the second mirror coating, and
a difference between the pencil hardness of the second mirror coating and a pencil hardness of the protective coating is within three grades.

17. The building material according to claim 1, wherein the first resin material comprises at least one of an ultraviolet-cured acrylic resin and a urethane resin which has Tg. (glass transition temperature) higher than Tg. of the second resin material.

18. The building material according to claim 1, wherein the first resin material comprises a urethane resin having Tg. (glass transition temperature) higher than Tg. of the second resin material.

* * * * *